United States Patent [19]

Holcomb

[11] 4,141,587
[45] Feb. 27, 1979

[54] CYCLE SEAT WITH BACK SUPPORT

[76] Inventor: Stephen A. Holcomb, 1369 N. Los Robles Ave., Pasadena, Calif. 91104

[21] Appl. No.: 876,647

[22] Filed: Feb. 10, 1978

[51] Int. Cl.² ............................................. B62J 1/00
[52] U.S. Cl. .................................. 297/195; 224/30 R; 297/DIG. 9
[58] Field of Search ......................... 297/195, DIG. 9; 224/31, 5.1, 30, 39, 32 R, 32 A

[56] References Cited

U.S. PATENT DOCUMENTS

| | | | |
|---|---|---|---|
| 1,367,981 | 2/1921 | Lawrence | 297/DIG. 9 |
| 2,147,732 | 2/1939 | Boynton | 297/195 X |
| 3,746,392 | 7/1973 | German | 297/195 |
| 3,822,917 | 7/1974 | George | 297/195 |
| 3,913,974 | 10/1975 | Bowen | 297/195 |
| 3,970,345 | 7/1976 | Holcomb | 297/195 |

Primary Examiner—Roy D. Frazier
Assistant Examiner—Peter A. Aschenbrenner
Attorney, Agent, or Firm—Wm. Jacquet Gribble

[57] ABSTRACT

The seat has a base and a backrest with the backrest curving upwardly from the base. A pad of similar configuration is fixed to the base and the backrest. A pair of spaced leaf springs intervene between the pad and the seat in the zone where the base and backrest join. The seat is fastened to the cycle by means of a pierced post bracket. A longitudinal frame fixed to the seat base has spaced rails with pluralities of transversely aligned apertures in which a transverse rod may be selectively placed to locate the seat base with respect to the post bracket which is adapted to be secured to the seat post rising from the cycle frame. A forward clamp near the front end of the seat base clamps about a horizontal frame member of the cycle. The clamp restrains a strap secured in vertically spaced relationship to the bottom portion of the seat base. The strap adjustably restrains a forward portion of the post bracket. The frame rails extend rearwardly of the backrest to afford attachment of a combination of accessories, such as racks and bags, which may be attached to either or both of the backrest and the rails in addition to being supported by the rear axle or the rear wheel fork.

6 Claims, 11 Drawing Figures

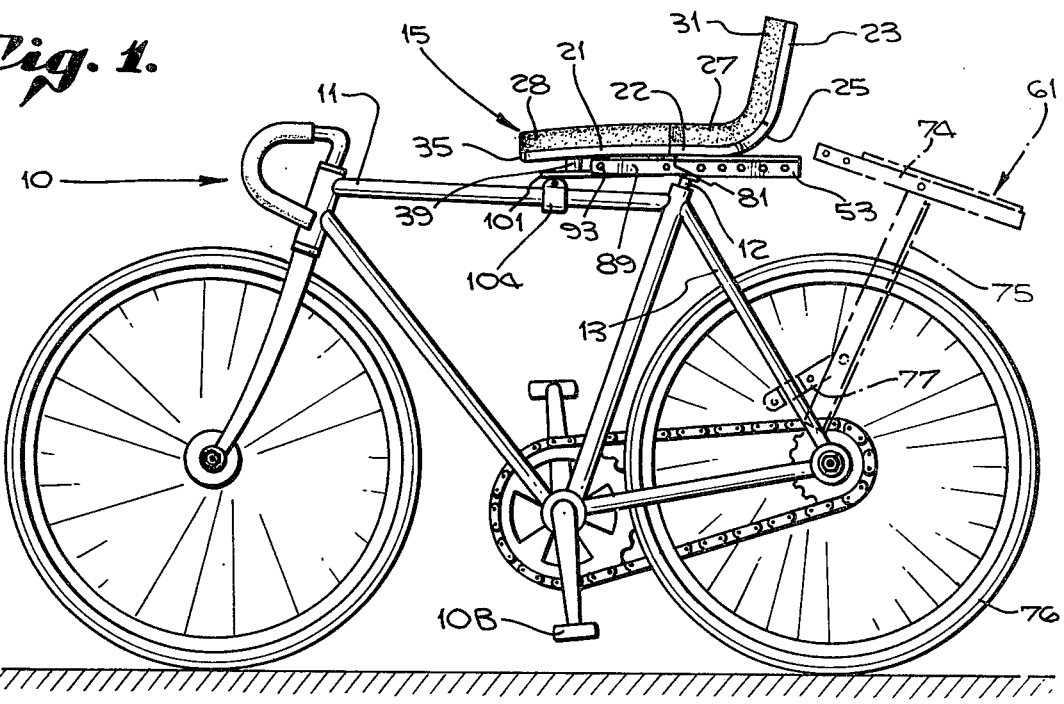
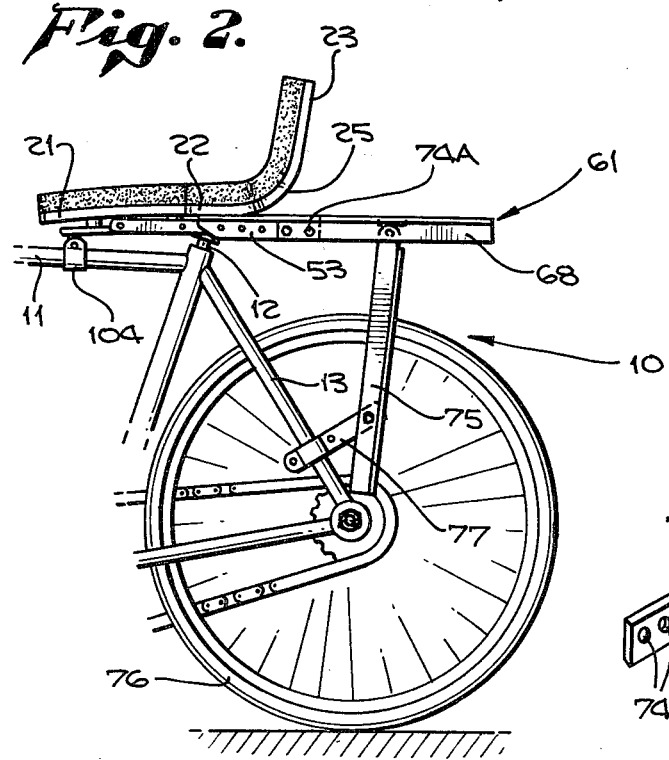
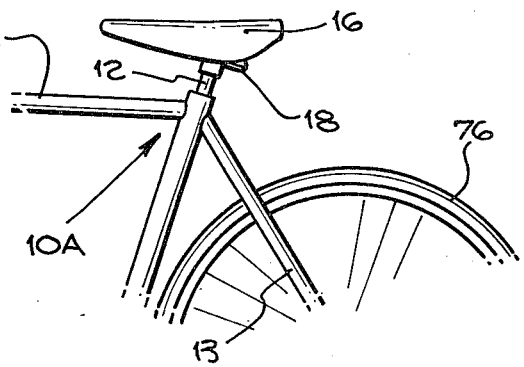
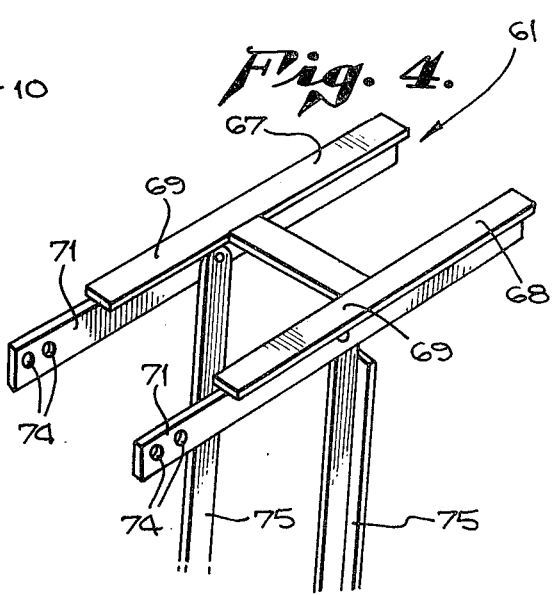

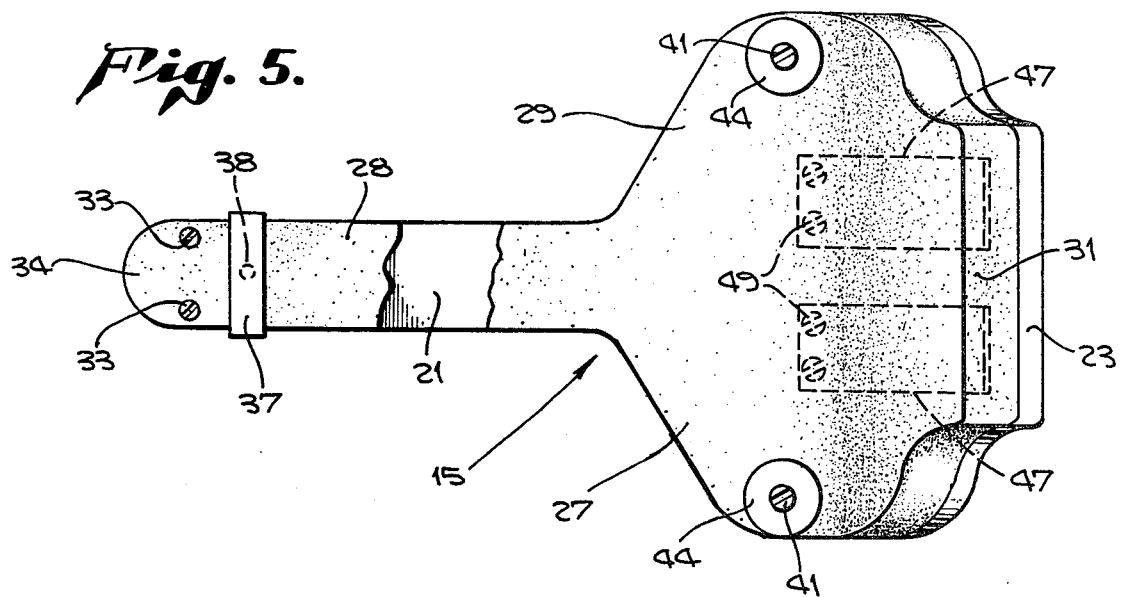
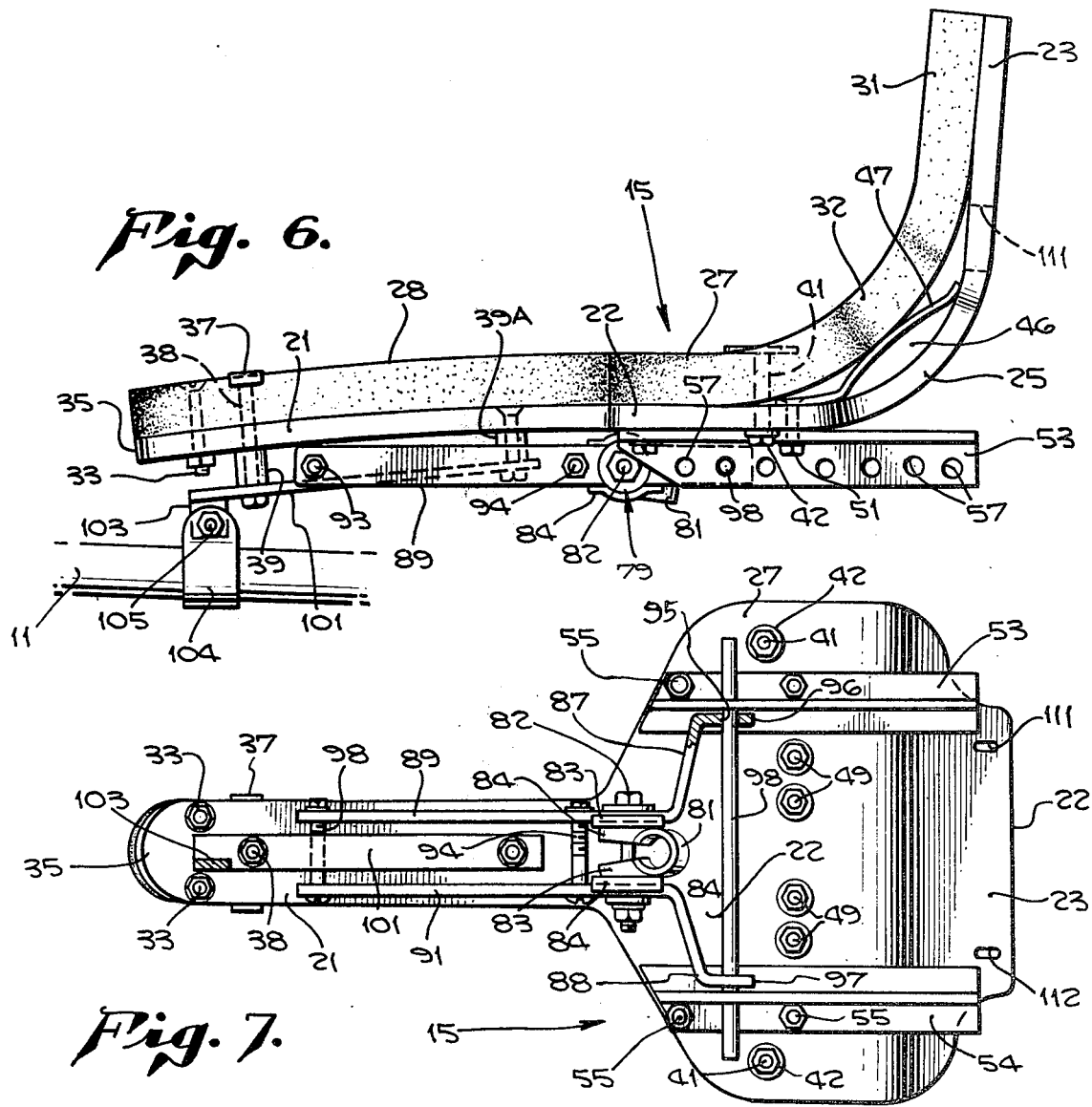

CYCLE SEAT WITH BACK SUPPORT

BACKGROUND OF THE INVENTION

The invention relates to seats for wheeled vehicles such as bicycles and motorcycles and more particularly relates to seats having backrests to increase the comfort and the leg thrust of the cyclist. Such seats are exemplified by my previous U.S. Pat. No. 3,970,345 issued July 20, 1976.

Conventional bicycle seats have been modeled after and designed for racing bicycles and their principal aim is high speed efficiency. Such seats do not afford much buttocks support to average riders and do not augment the leg thrust. Some conventional seats have provided minimal spring support for the saddle sheath but none has provided adequate support for the buttocks commensurate with comfort for the average rider.

I have invented a seat for cycles which not only provides for effective leg thrust when used with pedalled cycles, but affords back support and leg motion clearance and ancillary means for attaching cargo-carrying devices without impeding the action of the rider. The bulk of conventional coil springs is eliminated by the use of leaf springs between a seat base and a complementary seat pad such that the seat need not rise appreciably above the upper frame member and may thus be accommodated to riders with shorter than average limbs.

SUMMARY OF THE INVENTION

The invention contemplates a seat for a conventional cycle having an upper frame member and an upwardly protruding seat post and comprises a backrest with a seat base joined to the backrest and transversely spaced rails with longitudinally spaced apertures in the rails fixed to the seat base bottom. A seat post bracket adapted to clamp to the protruding conventional seat post has rearwardly diverging arms that are pierced so that latch rods may pass through the pierced arms and register in the aligned pairs of rail apertures to secure the rails and the seat fixed to the rails longitudinally with respect to the seat post bracket. A loop clamp forward of the post bracket secures the seat base to the upper frame member of the cycle. A resilient pad covering the seat base and seat backrest has one or more leaf springs intervening between the pad and the seat at the juncture of the base and backrest.

The invention thus affords a cycle seat, primarily for use on bicycles, which has unique features, affords efficient pedalling motion for the legs of a rider and adapts to a multiplicity of cargo-bearing attachments.

These and other advantages of the invention are apparent from the following detailed description and drawing.

BRIEF DESCRIPTION OF THE DRAWING

FIG. 1 is a side elevational view of a cycle combined with the cycle seat of the invention;

FIG. 2 is a fragmentary side elevational view of the embodiment of FIG. 1 with a cargo rack attached to the cycle seat;

FIG. 3 is a fragmentary side elevational view of a bicycle showing a conventional cycle seat;

FIG. 4 is a fragmentary perspective view of a cargo rack;

FIG. 5 is a plan view of a preferred embodiment of a seat of the invention;

FIG. 6 is a side elevational view of the seat of FIG. 5;

FIG. 7 is a bottom plan view of the seat of FIG. 5;

FIG. 8 is a fragmentary side elevational view of the seat of FIG. 5 on a conventional bicycle and carrying a newsboy's paper bag;

FIG. 9 is a view similar to FIG. 8 showing a back pack carried by the seat and rack of the invention;

FIG. 10 is a fragmentary side elevational view similar to FIG. 8 and showing a child's seat attached to the seat of the invention; and FIG. 11 is a fragmentary side elevational view showing a food chest supported by the seat of the invention.

In the various Figures like parts are designated by like reference characters.

DESCRIPTION OF THE PREFERRED EMBODIMENTS

In FIGS. 1 and 2 a bicycle 10 of conventional nomenclature has an upper frame member 11 and a conventional seat post 12 projecting above the frame member at the juncture of the upper frame member and a rear wheel fork 13. A cycle seat 15 in accordance with the invention is secured to the bicycle at the seat post. Member 11, post 12 and fork 13 are conventional bicycle components.

Bicycle 10A, shown fragmentarily in FIG. 3, has a like combination of conventional parts, but also includes a conventional bicycle seat 16 of racing configuration. Seat 16 is fixed normally to a seat post 12. The seat 16 has no backrest and is narrow transversely, affording good leg freedom but little weight support area, and minimal resilience from coil springs such as spring 18 shown in part in FIG. 3. This is in contrast to the elements combined in applicant's seat, as shown in plan view in FIG. 5, where a narrow forward tongue 21 extends from a transversely broad seatrest 22 from which a shaped backrest 23 rises. A transition or curving joinder element 25 connects between the base tongue.

In order to provide a more resilient ride, a pad 27 of a dense foamed plastic such as urethane or other like foamed, resilient plastics. One such plastic is marketed under the trade name "Ethophome". Like the seat the pad had narrow forward tongue 28 and a transversely broad rest 29 which extends upwardly in a backrest pad 31. A curving transition 32 connects tongue and backrest portions.

The particular plastic foam utilized for pad 27 is not subject to fragmentation and withstands abrasion well. It is of the type of urethane foam conventionally used for such things as exercise mats. It can therefore be secured to the base seat 21, 22 by suitable adhesives or by clamping means such as those shown in FIGS. 5 through 7 wherein countersunk bolts 33 secure the front tip 34 of the pad to the front tip 35 of the seat base. A secondary clamp 37 is secured by means of bolt 38 which extends through the pad and the base, and through a spacer 39 to be described further on in the specification. At the transversely broad section of the seat 15 and near the peripheral edges of the pad and the seat base are fastening bolts 41 which extend through the pad and the base to securing nuts 42 (see FIGS. 6 & 7). Broad discs or washers 44 protect the pad against the clamping force of the bolts 41.

As can be seen from FIG. 6 the respective transition curvatures of the seat base and the pad differ such that a void 46 exists between the undersurface of the pad and the upper surface of the seat base. In this void resilient leaf springs 47 are secured to impart increased resiliency at the point of maximum body thrust when pedalling. The leaf springs are convex with respect to the seat and each is secured by a bolt 49 extending through the seat and secured beneath the seat by a nut 51.

As can be seen from FIG. 7, transversely spaced, parallel rails 53,54, preferably of T section, are each fixed by rail holder bolts 55 to the bottom of transversely broad section 22 of the seat base. As seen in FIG. 6 the rails 53,54 extend rearwardly beyond the juncture of broad section 22 and curving transition 25. Each rail 53,54 has a plurality of perforations 57 which are transversely aligned with like perforations in the opposite rail. These perforations and the rearward extension of the rails afford means for attaching cargo-carrying accessories like a rack extension 61 shown in broken lines in FIG. 1 detached from the rails, and in rail supported position in FIG. 2.

A perspective detail of the rack extension 61 is shown in FIG. 4 wherein T section spaced members 67,68 are seen to have upper beams 69 removed at the forward portion such that each forward web 71 is adapted for overlap attachment to a rail 53,54 with the upper surface of the web surface 71 lodging beneath the upper beams 69A of the rail. Longitudinally spaced apertures 74 in the forward webs align with the perforations 57 of the rails such that standard fasteners 74A may be used to secure the rack extension to the seat. Vertical supports 75 are secured conventionally to the members 67,68 of rack extension 61 and extend on either side of conventional rear bicycle wheel 76 to be secured to rear fork members 13 by an articulated clamp tie 77 as shown in FIG. 2. The vertical supports 75 may be of angle iron as shown or other shaped stock Of suitable rigidity. Adjustment of the attitude of the rack of extension may be made through adjusting the overlap of the apertures 74 with the perforations 57 and by the angle of attachment of clamp tie 77 to rear fork 13.

The stability of the rack extension 61 can be no greater than the stability with which the seat is fixed to the cycle. The seat is secured at two points to conventional members of the cycle frame. As can be seen particularly from FIGS. 6 and 7 a seat post bracket 79 has a seat bracket U-clamp 81 adapted to fit about conventional seat post 12. The seat bracket has a clamping bolt 82 passing through spaced wings 83 of clamp 81 and through spaced channel segments 84 which open outwardly to receive the right and left forks 87,88 of the seat post bracket. Forward limbs 89,91 of the bracket fork are tied together by longitudinally spaced transverse bolts 93,94. Rearward arms 96,97 of bracket forks 87,88, respectively, are each perforated at 95 to receive a locking rod 98 which extends through the perforated arms and through apertures 57 of rails 53,54 to determine the position of the bracket with respect to the wide portion of the seat.

Relatively speaking the seat may thus be adjusted with respect to the conventional seatpost 12 and thus to the pedals 10B of the cycle for the comfort of the rider.

The forward extension 21 of the seat 15 not only affords an alternative rest for the rider but also affords means for positively setting the attitude of the seat with respect to upper frame member 11. A restraint strap 101 (see FIG. 7) is located between the forward limbs 89,91 of the seat bracket fork. The strap is spaced from the undersurface of tongue 21 by spacers 39,39A (see FIG. 6). The seat may thus be adjusted with respect to the seat post bracket the distance between the spacers 39,39A within the limitation of the longitudinal spread of the aligned apertures 57 of rails 53,54.

The forward portion of strap 101 has a downwardly depending tang 103 which carries a securing loop 104 closed and fixed to the tang by a bolt 105. The loop is secured about upper frame member 11 of the cycle when the seat is installed on the cycle and limits the spacing of the seatbase above the frame member 11 without limiting the longitudinal positioning of the seat with respect to the seatpost. Alternate loops 104 of differing lengths may be used to adjust the front seatbase height while the post 12 may be raised or lowered conventionally to adjust the height of the seat rear.

Once the seat is installed at the proper setting for the particular rider it may be quickly adjusted for another rider by removing lock rod 98 and changing the position of the seat with respect to the seat bracket by moving the seat forwardly or rearwardly to the desired position and then placing lock rod 98 through apertures 57 of the rails 53, 54 and the perforations 95 in the fork arms 96,98 of the seatpost bracket.

Figures 8, 9, 10, 11:
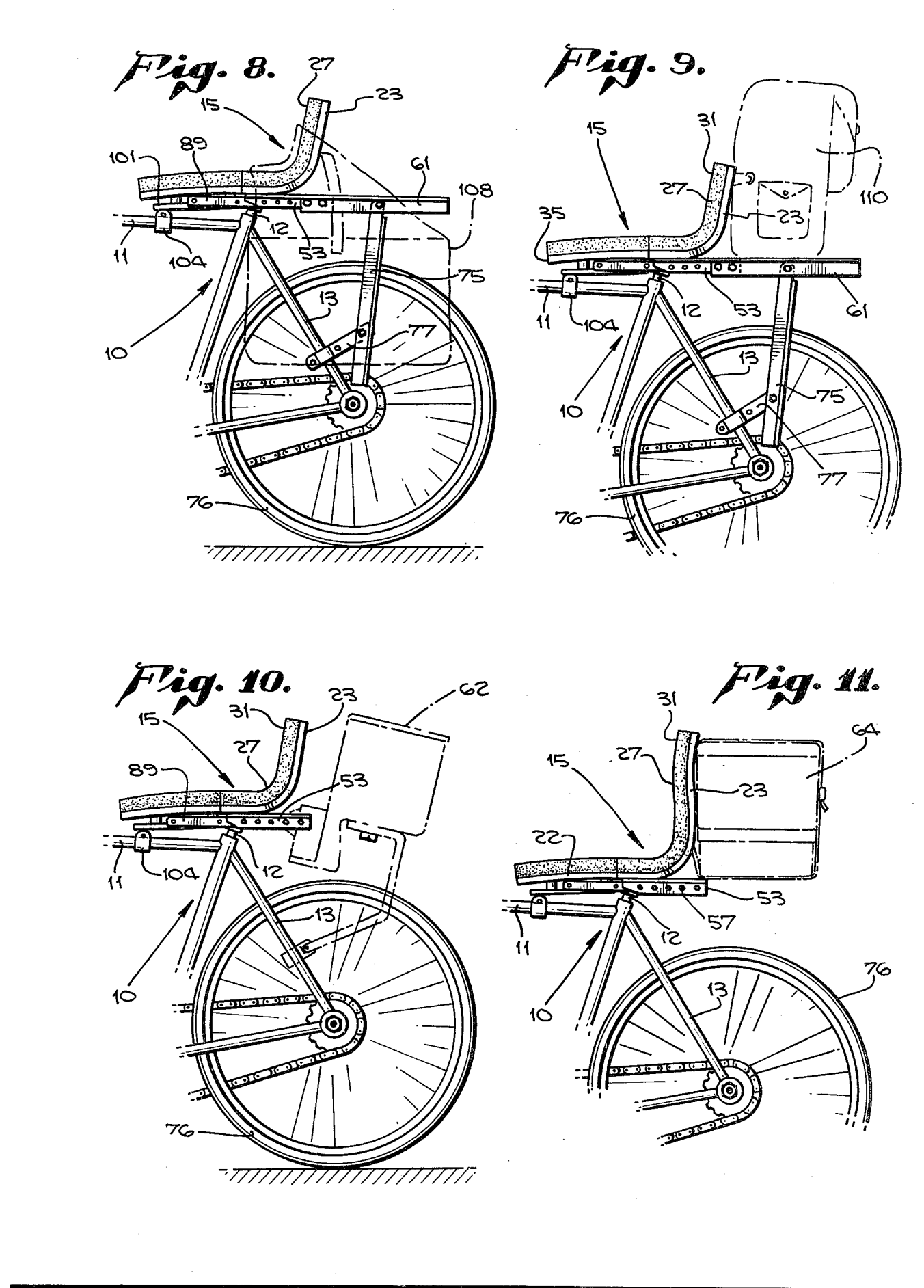

With the seat in place carrier 61 may be quickly attached to the extending rails and to the rear fork in the manner described. It is then possible to utilize the seat and the rack for various cargo carrying implements such as the newsboy bag 108 of FIG. 8, which has its yoke 109 passed across seat 15 and is draped over rack extension 61 and hangs downwardly on either side of rear wheel 76 of the cycle.

Alternatively a fully packed backpack 110 may be rested upon rack extension 61 as shown in FIG. 9 and one strap thereof passed through transversely spaced slots 111, 112 (FIG. 7) of the upright portion 23 of the backrest to secure the backpack to the backrest.

With rack extension 61 removed the child's seat 62 of conventional construction may be secured to rails 53,54 and rear fork 13 in conventional fashion to afford that facility to the bike rider. Similarly, an ice chest or a food hamper 64 may be rested on the stub end of the rails 53,54 and secured by a wrap-around strap fixed to backrest 23 by means of slots 111,112 and carried securely behind the seat with the weight taken by the rails.

None of these advantages is available to the conventional bike seat shown in FIG. 3. In addition, applicant's unique combination of a resilient pad and curved leaf springs at the zone of greatest body thrust when pedalling, affords both comfort and efficiency not available to a rider of the conventional seat. The seat shape, most completely visible in FIG. 5, is unique in that long tongue 21 effects a stable seat without limiting the adjustability of the seat, and the breadth of the transversely broad section 22 affords riding comfort unavailable in conventional seats.

In the pedalling motion the conventional seat affords ample clearance for the reciprocating action of the thighs of the rider but places most of the weight on the pelvic area with a subsequent diminution of comfort. By broadening the rearward portion of the seatbase applicant affords more comfortable support to the buttocks without depriving the thighs of freedom of motion because forward extension of the broad area is attenuated. The backrest not only affords comfort in leisurely biking but affords a thrust base which adds to the efficiency of pedalling. The conventionally equipped cyclist is limited to a thrust effectiveness developed either by his limited body weight or by the strength of his arms and hand grip to resist the thrust of the legs. This limitation is obviated in applicant's combination by the backup of the backrest of the applicant, whereupon the thrust developed by the legs is independent of the arm strength or hand grip of the handle bars.

Several cargo receiving variations have been shown illustrated by the description and drawing accompanying this specification. Further variations will occur to those skilled in this particular art. It is therefore desired that the invention be measured by the appended claims rather than by the disclosure of the illustrative embodiments.

I claim:

1. A seat for a conventional cycle having an upper frame member and a protruding seat post and comprising a backrest, a seat base joined to the backrest, transversely spaced rails each having longitudinally spaced apertures therein and fixed to the seat base bottom; a seat post bracket adapted to clamp to said seat post, rearward diverging pierced arms on said bracket, a latch rod adapted to pass through said pierced arms and reside in selected pairs of said aligned rail apertures to secure said rails and the seat fixed thereto longitudinally with respect to said post bracket, clamp means forward of said post bracket for securing said seat base to said upper frame member, a resilient pad on said seat base and backrest, a leaf spring intervening between said pad and said seat base and backrest, and means securing said leaf spring between said pad and said seat base and backrest.

2. A cycle seat in accordance with claim 1 wherein a curving joinder links said seat base and said backrest.

3. A cycle seat in accordance with claim 2 wherein said pad is continuous across said joinder.

4. A cycle seat in accordance with claim 3 wherein said leaf spring is secured between said pad and said base and backrest substantially along a chord of said curving joinder.

5. A cycle seat in accordance with claim 2 further comprising rail extensions rearward of said joinder, said extensions being apertured to afford attachment for cycle load carrying accessories.

6. A cycle seat in accordance with claim 4 wherein said seat base further comprises a transversely broad rest adjacent said joinder, a transversely narrow tongue away from said joinder, and an angled border between said tongue and said broad rest at the junctures thereof.

* * * * *